United States Patent [19]

Metz et al.

[11] Patent Number: 4,502,366
[45] Date of Patent: Mar. 5, 1985

[54] HYDRAULIC RECOIL BRAKE SYSTEM FOR BRAKING THE GUN BARREL RECOIL MOVEMENT AFTER THE FIRING TRAVERSE

[75] Inventors: Josef Metz, Neuss; Erich Zielisnki, Haan, both of Fed. Rep. of Germany

[73] Assignee: Rheinmetall GmbH., Duesseldorf, Fed. Rep. of Germany

[21] Appl. No.: 527,317

[22] Filed: Oct. 31, 1983

Related U.S. Application Data

[63] Continuation of Ser. No. 185,581, Sep. 9, 1980, abandoned.

[30] Foreign Application Priority Data

Oct. 25, 1979 [DE] Fed. Rep. of Germany ....... 2943083

[51] Int. Cl.³ .............................................. F41F 19/02
[52] U.S. Cl. .................................... 89/43 R; 188/316; 188/320
[58] Field of Search ................. 89/43 R; 88/316, 317, 88/320

[56] References Cited

U.S. PATENT DOCUMENTS

| 407,018 | 7/1889 | Koerner | 89/43 R |
|---|---|---|---|
| 1,159,543 | 11/1915 | Stock | 89/43 R |
| 2,332,520 | 10/1943 | Lucht | 89/43 R |
| 2,433,764 | 12/1947 | Kottemann | 188/316 |
| 3,410,174 | 11/1968 | Hahn | 89/43 R |

FOREIGN PATENT DOCUMENTS

| 542316 | 1/1932 | Fed. Rep. of Germany | 89/43 R |
|---|---|---|---|
| 737376 | 7/1943 | Fed. Rep. of Germany | 89/43 R |
| 125465 | 4/1919 | United Kingdom | 89/43 R |
| 249928 | 4/1926 | United Kingdom | 188/317 |

OTHER PUBLICATIONS

Rheinmetall, Waffentechnisches Taschenbuch, 1977, pp. 344–345, 448–449.

Primary Examiner—Stephen C. Bentley

[57] ABSTRACT

A hydraulic recoil brake system for braking the recoil of a gun barrel during and after the firing traverse period. The system includes a hydraulic cylinder in which a hollow piston and piston rod are reciprocally mounted in the cylinder. The piston rod is connected to the gun barrel. A regulating throttling mandrel is fixedly mounted in the cylinder and axially extends into the hollow piston and hollow cylinder. The piston and cylinder are constructed and shaped in such a way that at least two flow passages $F_1$ and $F_2$ are defined. While the first flow passage $F_1$ is present during the entire recoil movement the second flow passage $F_2$ is present only during the firing traverse period. The second flow passage $F_2$ extends from a first inner partial chamber disposed in front of the recoiling piston to a second partial inner chamber disposed behind the recoiling piston.

1 Claim, 2 Drawing Figures

HYDRAULIC RECOIL BRAKE SYSTEM FOR BRAKING THE GUN BARREL RECOIL MOVEMENT AFTER THE FIRING TRAVERSE

This application is a continuation of application Ser. No. 185,581, filed Sept. 9, 1980, now abandoned.

BACKGROUND OF THE INVENTION

The invention pertains to a hydraulic cylinder recoil brake system. Such type of cylinder recoil brake systems form part of the state of the art and are, for example, described in German Pat. No. 737,376. In such system the hollow piston rod includes at its free end a piston-like entraining collar. The piston proper is movably mounted on the piston rod along a path limited by a shoulder formed by the end surface of the collar. Moreover, the piston proper includes three zones of differing interior diameters. In the first zone the piston is formed with an inner recess adapted to receive the collar of the piston rod. This first zone extends to a limit surface at which the second zone with a reduced interior diameter, formed as a second interior recess, adjoins. The second zone extends to the second limit surface, which forms a bearing surface for a coil spring surrounding the piston rod, the other end of which bears against one of the limit surfaces of the collar. The third region is formed as a sliding seat relative to the piston rod and has its free end form a confronting annular surface bearing against a collar of the piston rod. The passages in the piston form a conduit jointly with the passages in the piston rod when the shoulder of the piston rod abuts against the first shoulder o the piston. This condition occurs when the piston rod moves with the recoiling gun barrel initially only against the restoring force of the coil spring and only starts to entrain the piston. There is then displaced firstly hydraulic fluid through the piston which causes the braking effect. This braking effect begins only when the projectile has left the gun barrel.

With high performance cannons the recoil velocity of the gun barrel amounts to 8 to 13 $ms^{-1}$. Due to the sudden shock impact of the entraining collar on the corresponding stop surface in the piston and the similar shock impact of the piston on the shoulder of the piston rod danger of undue deformations is brought about, which can lead to malfunctioning and to uselessness of the entire installation. Moreover, it is undesirable for purposes of forming the required uniform braking force effect, to have a pressure peak present at the beginning of the braking effect. An initial value of the braking force should not exceed 1.1 to 1.2 times the average braking force, because otherwise disadvantageously high forces appear in the gun carriage.

SUMMARY OF THE INVENTION

It is the general object of this invention to eliminate or mitigate the afore-described drawbacks in a hydraulic cylinder recoil brake system of the afore-described type and to provide for the modern high performance cannons a reliable arrangement in which substantially the braking effect occurs only after the traverse firing time (as defined on pages 384 and 385 of Waffentechnisches Taschenbuch/Rheinmetall 3rd edition 1977) and in which excessively high and thereby damaging forces acting on the gun carriage are eliminated. Due to the fact that in the inventive arrangement the recoil movement of the gun barrel occurs to a large extent without braking, the to be expected cylinder oscillation occurs only after the exiting of the projectile. Therefore this factor is removed as an additional disturbing influence for the operation of the installation. In this manner it is possible to narrow the distance between the average impact point from installation to installation in certain weaponry, for example, tank cannons, to thereby reduce the collective scatter region.

The hydraulic cylindrical recoil brake system of this invention performs the object of the invention in providing two passages shaped and constructed in such a way as to permit the transfer of the braking fluid at the initial movement of the piston for the firing traverse period, so that two different liquid streams form and an unavoidable liquid remanent force during the firing traverse period remains negligible.

The arrangement of the invention is of particularly simple construction.

BRIEF DESCRIPTION OF THE DRAWINGS

These and other objects of the arrangement of the present invention are realized and illustrated in the several preferred embodiments shown in the accompanying drawings.

DESCRIPTION OF PREFERRED EMBODIMENTS

Figures 1, 2:
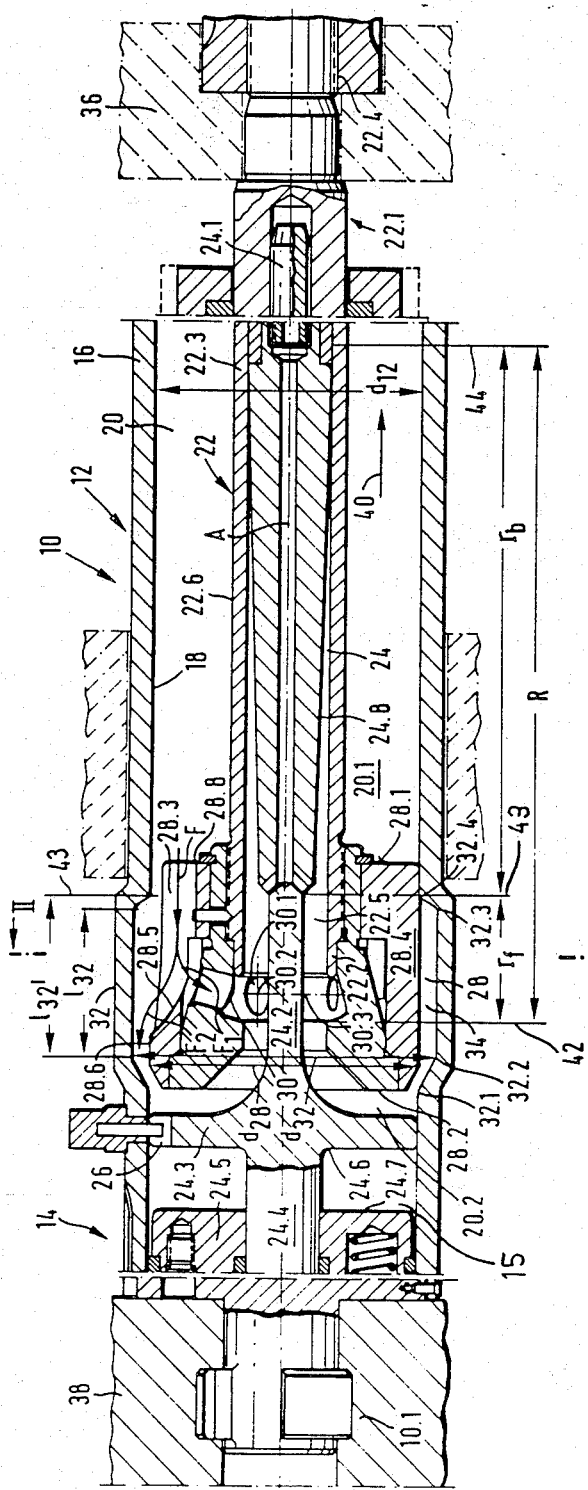
FIG. 1 is a longitudinal sectional axial view of a hydraulic cylindrical braking system in accordance with the invention, wherein one portion thereof is illustrated as displaced.
FIG. 2 is a sectional view along line II—II in FIG. 1; at all times only the significant details and couplings of the arrangement are illustrated and described.

There is illustrated in FIG. 1 a hydraulic cylinder 10 having cylindrical walls 16 defining a braking chamber 12 and a heat compensation chamber 14. The cylinder 10 is rigidly connected to a gun carriage 38 (not illustrated in detail) via an extension and spring ring 10.1. Both chambers 12 and 14 have substantially the same interior diameter $d_{12}$. The piston rod 22 extends axially through the inner space 20 of the brake chamber 12. The piston rod 22 has an end portion 22.1, extending outside of the cylinder 22, which is threadably connected to the bottom rear portion 36 of a non-illustrated cannon by means of the threaded portion 22.4 of the piston rod 22. The other end 22.2 of the piston rod 22 is connected to a braking piston 28 having an enlarged diameter $d_{28}$. A regulating mandrel 24 is axially disposed within the hydraulic cylinder 10. The regulating mandrel 24 is surrounded by the cylindrical walls 22.6 of the hollow piston rod 22. The regulating mandrel 24 has an extension 24.2 which expands into a separating wall 24.3 that is fixedly mounted on the cylindrical wall 16 of the hydraulic cylinder 10 and separates the hydraulic cylinder 10 into a braking chamber 12 and a heat compensation chamber 14. The free end 24.1 approaches during firing (FIG. 1) the free end 22.1 of the piston rod 22. The separating wall 24.3 has at its upper side a passage 26. A coaxially extending piston rod 24.4 extends through the heat compensation chamber 14 side and supports coaxially thereon a floating compensation piston 24.5. The longitudinal axial extent of the braking piston 28 is defined by two transverse surfaces 28.1 and 28.2. There are six recesses extending along the periphery of the braking piston 28 which are angularly spaced at equal distance from each other. Adjacent recesses 28.3 are separated from each other by longitudinal cross bars 28.4. Each recess 28.3 extends from an edge 28.8 of the braking piston 28 parallel to the longitudinal axis A of the hydraulic cylinder to the arcuate edge 28.6 along the periphery 28.7 of the braking piston 28. Base surface 28.5 of the recess 28.3 extends initially parallel to the longitudinal axis A and then inclines arcuately upwardly up to the edge 28.6 of the braking piston 28. Each recess 28.3 has a passage 30 substantially radially extending between the inner space 20 and the inner chamber 22.5 of the piston rod 22. The brake piston 28 divides the inner chamber 20 of the braking chamber 10 into a partial chamber 20.1 defined by the transverse end surface 28.1 of the piston 28 and the non-illustrated end wall of the cylinder 10 and another partial chamber 20.2 disposed between the transverse end surface 28.2 of the piston 28 and the transverse wall 24.3, whereby the volumes of the two partial chambers change with the axial movement of the piston 28. There is a region 32 of enlarged internal diameter adjoining the heat compensation chamber 14 of the hydraulic cylinder 10, the internal diameter $d_{32}$ of which is larger relative to the internal diameter $d_{12}$ and extends axially over a length $l_{32}$.

An inner surface 18 of the cylindrical walls 16 has an edge 32.1 adjacent to the separating wall 24.3 from whence the inner diameter continously increases to a throat 32.2, that is the interior diameter increases from $d_{12}$ to $d_{32}$. A further throat 32.3 is disposed at a distance $l_{32}$ from the throat 32.2. The interior diameter continuously decreases from the throat 32.3 to an edge 32.4, that is the interior diameter decreases from $d_{32}$ to $d_{12}$. A frusto-conical surface partially defined by the edge 32.4 is separated from a second frusto-conical surface partially defined by the edge 32.1 by the distance $l_{32}$ along which the inner surface of the hydraulic cylinder 10 is cylindrical. Due to the enlarged portion 32 of the hydraulic cylinder 10 there is formed an annular passage 34 (FIG. 2). The inner space 20 of the braking chamber 12 and the inner space 15 of the heat compensation chamber 14 are filled with braking fluid which acts on confronting surfaces 24.6 and 24.7 respectively of the separating wall 24.3 and the compensating piston 24.5. The total recoil path R extends from a first limit 42 to a second limit 44, which is subdivided into a shorter partial recoil path $r_f$ extending between line 42 and 43 and a longer partial recoil path $r_b$ extending between lines 43 and 44.

Thus in other words the brake has an elongated cylinder 10 centered on an axis A and formed with an axially relatively short front portion 32 of relatively large diameter $d_{32}$ and an axially relatively long rear portion 16 of relatively smaller diameter $d_{12}$ adjoining the front portion 32. The terms front and rear here meaning left and right as seen in FIG. 1. This cylinder 10 has closed front and rear ends delimiting a chamber 12 extending axially along both portions 16 and 32. In use the cylinder 10 is secured to the gun mount 38 by way of threaded bolts. An annular piston 28 has an outside diameter $d_{28}$ equal substantially to the relatively small diameter $d_{12}$ of the rear portion, which piston subdivides the chamber 12 into rear and front compartments 20.1 and 20.2 respectively, and which piston has axially oppositely directed front and rear faces 28.2 and 28.1 exposed in the respective compartments 20.1 and 20.2. The piston 28 is formed with at least one radially outwardly open and axially extending groove 28.3 opening axially rearward of the rear piston face 28.1. This groove 28.3 is at least partially behind the the passage 30 which has uniformly decreasing flow cross section and terminates axially rearward of the front piston face 28.2. Thus fluid flow along the groove 28.3 and around the piston 28 between the compartments 20.1 and 20.2 is uniformly throttled and terminated as the piston 28 moves rearwardly and the groove 28.3 moves wholly into the small-diameter rear cylinder piston 16. An at least partially tubular piston rod 22 extends axially rearward from the piston 28 through the rear end of the cylinder and opens into the front compartment 20.2 A regulating mandrel 24 is fixed relative to and extending inside the tubular piston rod 22.

During recoil of the non-illustrated gun barrel the piston rod 22 and piston 28 move in the direction of the arrow 40. In the region of the recesses 28.3 there is formed a liquid stream F which, as is illustrated by arrows, divides into a first partial stream $F_1$ and a second partial stream $F_2$. The first partial stream $F_1$ is directed interiorly against the longitudinal axis A and begins in the part 20.1 of the inner space 20, flows through the passage 30 and the inner space 22.5 of the piston rod 22 and ends in the part 20.2 of the inner space 20, which increases in size during recoil. The second liquid stream $F_2$ is directed outwardly against the inner wall surface 18 of the cylinder 16 in the region 32 and travels from the part 20.1 of the inner space 20 passing along the peripheral surface 28.7 of the brake piston 28 into the inner space 20.2 along a comparatively shorter path. The first liquid stream $F_1$ is maintained substantially along the entire recoil path R and is throttled along a final, not further designated partial path, by means of the frusto-conical surface 24.8 of the regulating mandrel 24. The second liquid stream $F_2$ is formed at the beginning of the recoil of the brake piston 28 from the common original stream F. This stream has available first of all of the prevailing cross-sectional areas of the recesses 28.3 and then the annular passages 34. With the approach of the surface defined by the edge 28.6 to a plane transverse to the longitudinal axis A and passing through the edge 32.4, that is a plane passing through the line 43, the cross-sectional flow-through area for the stream $F_2$ decreases in size. As soon as a plane passing through the line 30.3, which passes through the central point 30.2 of the inner mouth 30.1 of the passage 30, reaches the plane of the edge 32.4, the available flow-through cross-sectional area for the liquid stream $F_2$ advantageously continuously decreases in dependence with the traverse of the base surface 28.5 up to the edge 28.6 on the periphery of the brake piston 28, so that the liquid stream $F_2$ is correspondingly throttled. The thereby already resulting braking forces can be disregarded as a factor causing the unavoidable frictional forces which appear during the recoil, and appear as well regularly in the counter-recoil in the form of an energy storage, which could produce damaging cylinder oscillation. With the traverse of the plane formed by the edge 28.6 past the plane defined by the line 43 the in the meantime strongly throttled liquid stream $F_2$ is completely cut-off. This is caused due to the fact that the previously continuously increasing throttling has been carried out substantially shock-free. As can be noted from FIG. 1, the line 43, which corresponds to the plane of the edge 32.4, forms a boundary between the shorter partial path $r_f$ and a longer partial path $r_b$ of the total recoil path R. The partial path $r_f$ corresponds essentially to the firing traverse period. Since the transfer from $r_f$, which corresponds to the partial path of a substantially unthrottled recoil, to the partial path $r_b$ of the throttled recoil, transpires without damaging shock, the gun carriage is loaded essentially shock-free within the afore-described boundaries, whereby the known wear is avoided, which could manifest itself particularly strongly, when, for example, a tank turret provided with two cannons mounted on adjacent gun carriages, has a support surface of the gun carriage which does not coincide with a lateral adjusting axis relative to the central normal plane. The braking system of the invention therefore advantageously makes possible a higher degree of design freedom in particular in the design of gun turrets for tanks.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. A recoil brake for use between a gun mount and barrel, the brake comprising:

an elongated cylinder centered on an axis and formed with an axially relatively short front portion of relatively large diameter and an axially relatively long rear portion of relatively small diameter adjoining the front portion, the cylinder having closed front and rear ends delimiting a chamber extending axially along both portions, so that the cylinder is secured to the gun mount with the front portion turned toward the barrel;

an annular piston having an outside diameter equal substantially to the relatively small diameter of the rear front portion, subdividing the chamber into front and rear compartments, and having axially oppositely directed rear and front faces exposed in the respective compartments, the piston being formed with at least one radially outwardly open and axially extending groove opening axially rearward at the rear piston face and with a radially throughgoing passage opening into the groove axially forward of the rear piston face, the groove being at least partially in front of the passage of uniformly decreasing flow cross section and terminating axially rearward of the front piston face, so that fluid flow along the groove and around the piston between the compartments is uniformly throttled and terminated as the piston moves rearwardly and the groove moves wholly into the small-diameter rear cylinder portion;

an at least partially tubular piston rod extending axially rearward from the piston through said cylinder rear end and being forwardly open so as to be in communication with the front compartment;

a separating wall secured in said cylinder in front of said front compartment;

a regulating mandrel fixed relative to and extending rearward from the rear side of said separating wall and having an axially rearwardly diverging control portion extending inside the tubular piston rod.

* * * * *